March 6, 1928.

J. BARNETT 1,661,159

RADIO CONDENSER

Filed May 29, 1923

Inventor:

James Barnett,

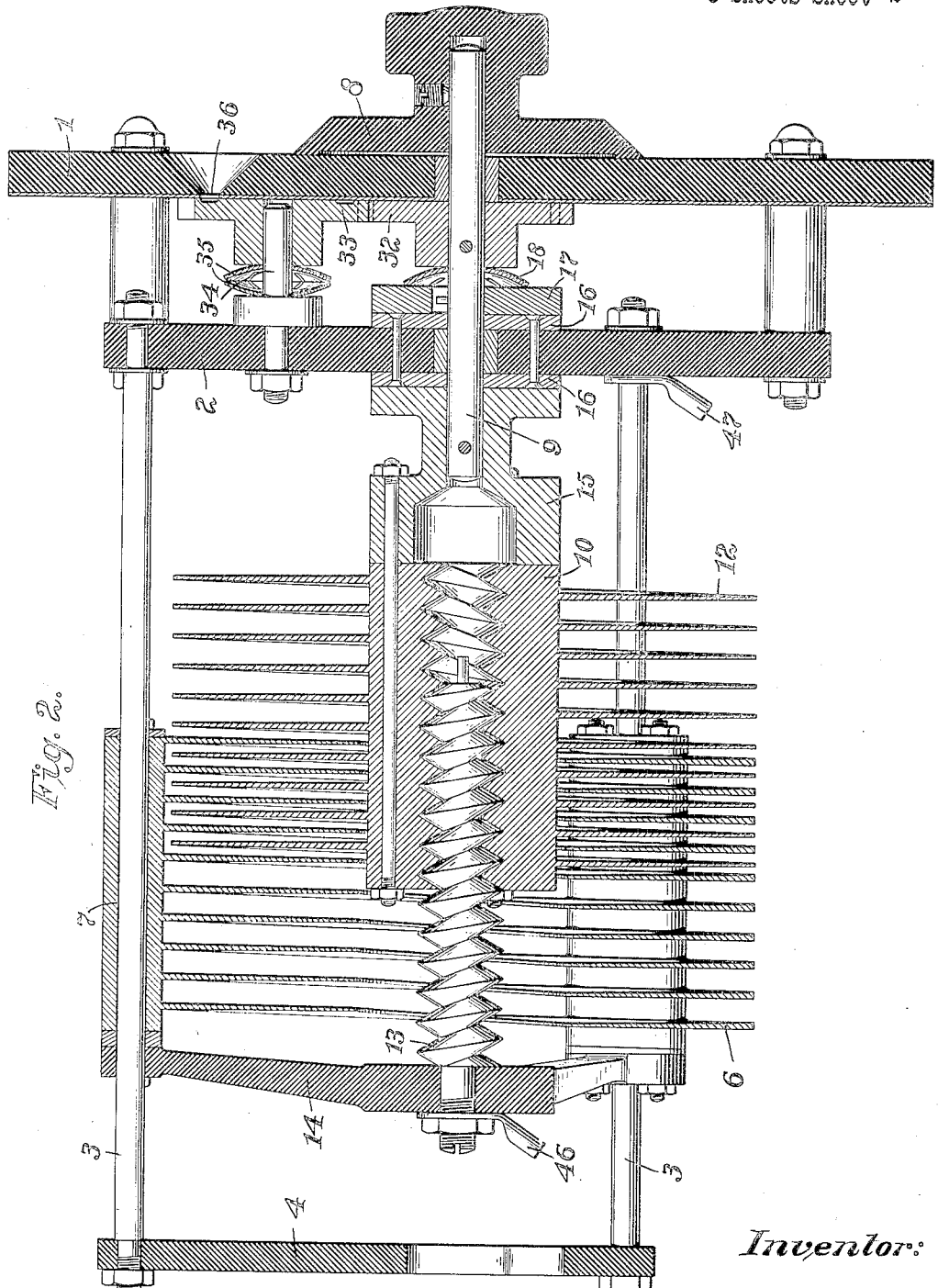

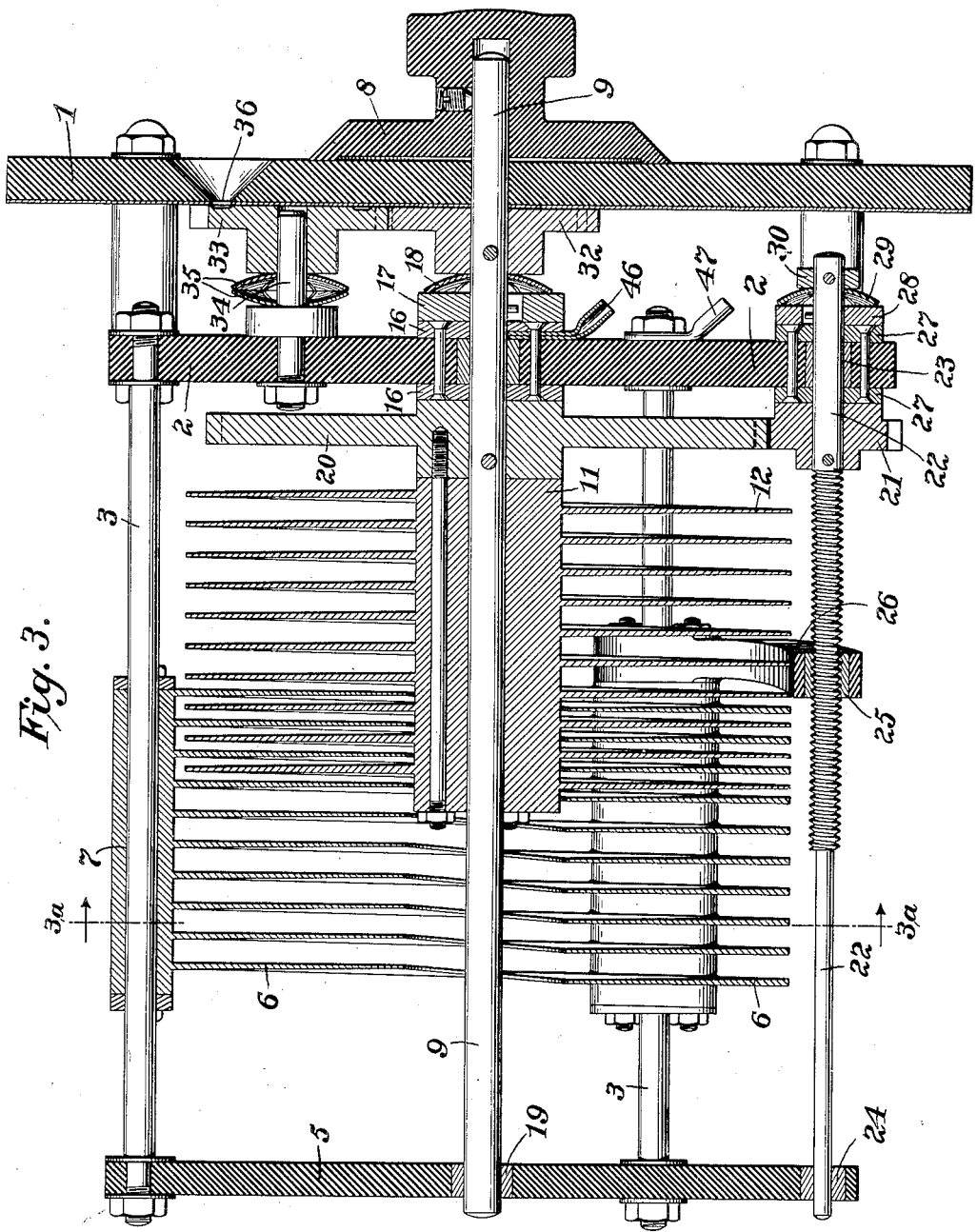

March 6, 1928.

J. BARNETT

RADIO CONDENSER

Filed May 29, 1923   6 Sheets-Sheet 4

Inventor:
James Barnett,
by Spear, Middleton, Donaldson & Spear
Attys

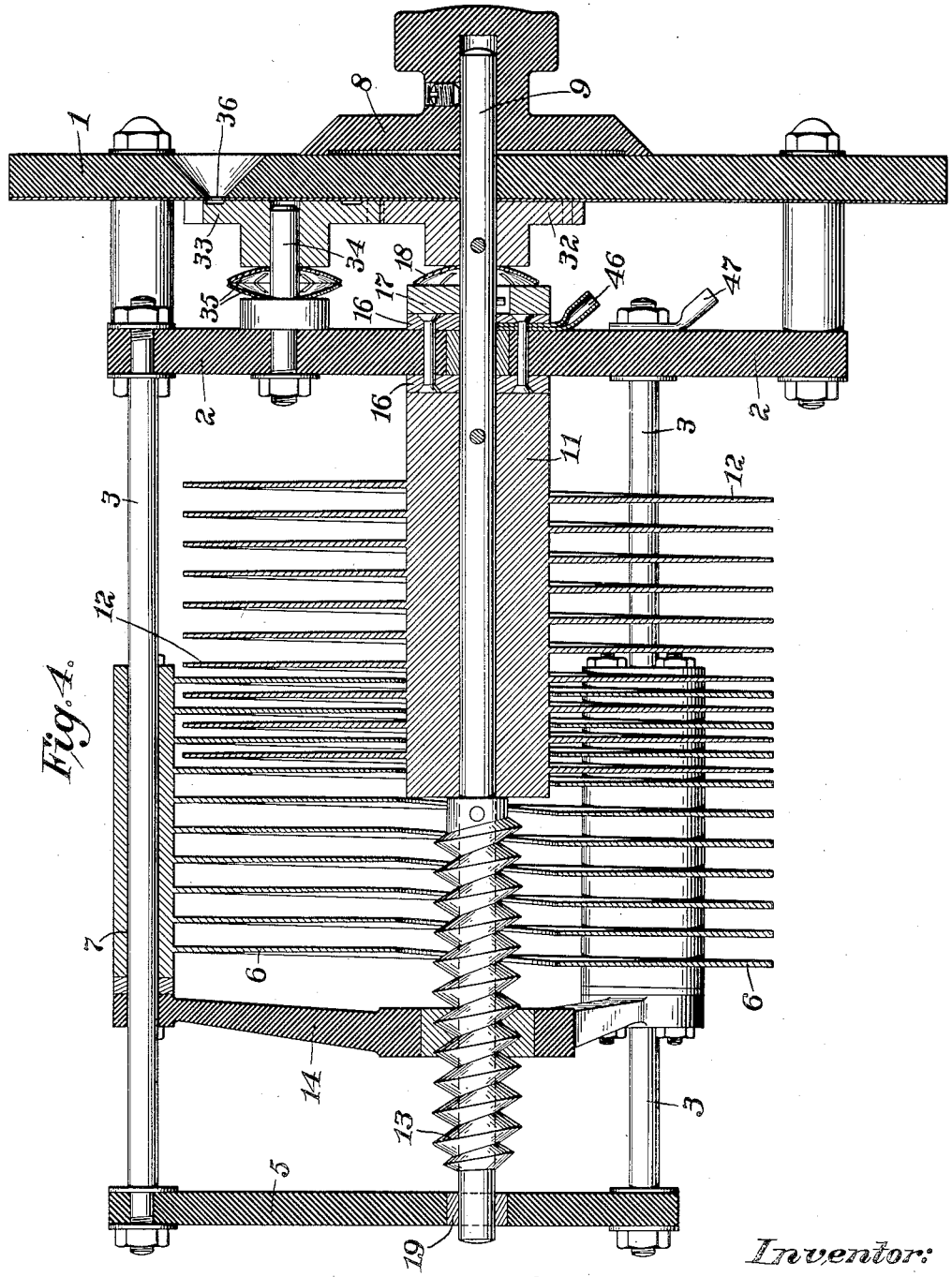

March 6, 1928.

J. BARNETT

RADIO CONDENSER

Filed May 29, 1923

Inventor:

James Barnett,
by Spear, Middleton, Donaldson & Hall
Attys.

Patented Mar. 6, 1928.

1,661,159

UNITED STATES PATENT OFFICE.

JAMES BARNETT, OF BALTIMORE, MARYLAND.

RADIOCONDENSER.

Application filed May 29, 1923. Serial No. 642,215.

The invention relates to electrical condensers or high-voltage accumulators of adjustable capacity, of a type suitable for use with high-voltage electric currents such as are used in radio telephony and telegraphy transmission and reception, measuring instruments such as capacity bridges and radio wave-meters, also other fields of application wherein this type of condenser could be employed.

More specifically, it pertains to an adjustable condenser of relatively compact, simple, inexpensive construction, having high electrostatic capacity for the size and quantity of materials used, and incidentally of such form as not to be easily liable to disarrangement or breakage.

Another object is to provide an adjustable condenser with its units so arranged that self-heating dielectric mediums such as air or other gases, oils or other liquids, may be employed in its construction.

Still another object is to provide an adjustable condenser with its units so arranged that non-fluid dielectric mediums, such as mica, hard-rubber, varnish films, synthetic resins, et cetera, may be employed in its construction.

The principal object of this invention is to furnish an adjustable condenser of such design that extremely fine gradations in capacity may be readily and simply made throughout the total range of the condenser's capacity.

A further object is to provide an adjustable condenser having an indicating device to show the various positions of adjustment so that the condenser may be readily and accurately reset to previously determined and recorded positions.

A still further object is to provide a type of adjustable condenser which when brought to a desired adjusted condition will remain in that condition until readjustment is desired.

Another object is to provide a construction of adjustable condenser utilizing electrodes in the form of helically warped surfaces, said electrodes consisting of either cast, rolled sheet, strip, machined metal, or insulating material having either an electrically conducting surface or an electrically conducting interior core, in either one piece units or else in units built up of several elements.

For details of the invention, reference may be made to the accompanying drawings. I have illustrated thereon typical forms of my invention, but I would have it clearly understood that modifications and refinements may be resorted to without departure from the real spirit and scope of the invention.

Referring to said drawings:

Fig. 2 is a longitudinal section of the adjustable condenser.

Figure 3 is a longitudinal section of the adjustable condenser with a slight modification of design.

Fig. 3ª is a cross section of the adjustable condenser shown in Fig. 3, taken on the line 3ª—3ª looking in the direction of the arrows.

Fig. 4 is a longitudinal section of the adjustable condenser with still another modification of design.

Figure 5:
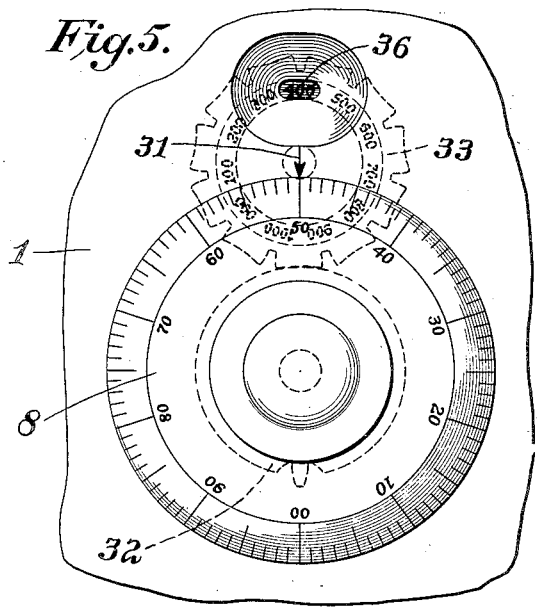
Figure 5A:
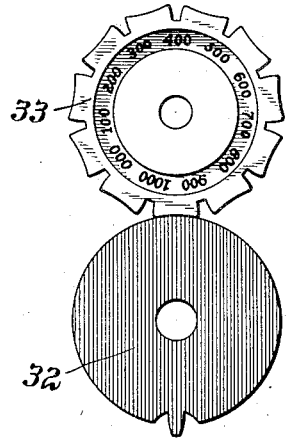

Fig. 5 is a detail view of the indicating mechanism which may however be modified so as to utilize any other type of mechanical movement for accomplishing the same purpose.

Fig. 5ª shows the turn-indicating elements of the indicating mechanism.

Figures 6, 6A:
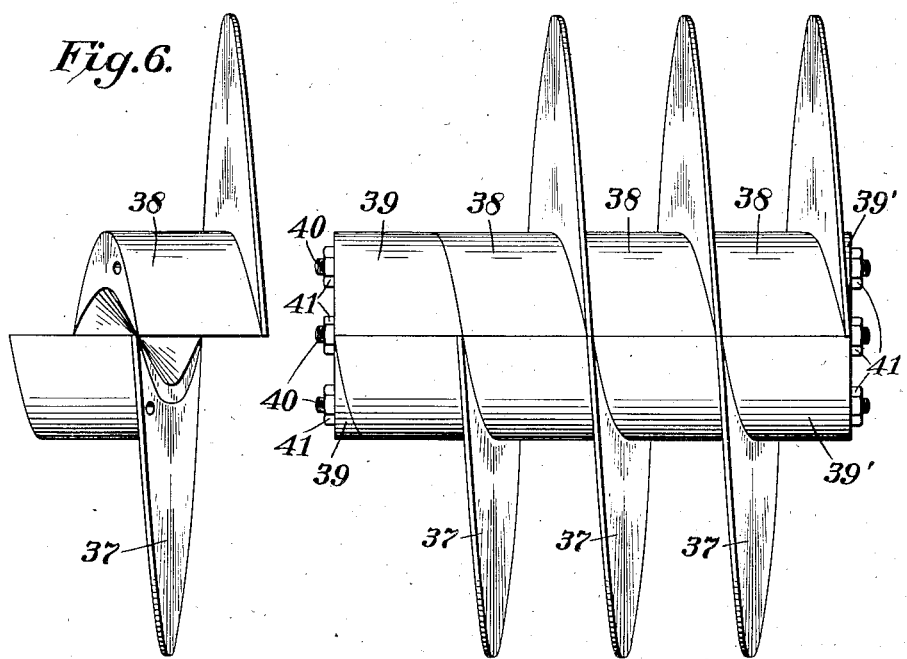

Fig. 6 is a view of one element of the rotating electrode which is typical of one element of the reciprocating electrode.

Fig. 6ª is an assembly of several elements so as to form a rotating electrode, and is typical of the assembly of several elements for forming the reciprocating electrode.

In these Figs. 6 and 6ª the pitch is shown greatly exaggerated to more clearly illustrate the true helical curve. This form of construction is shown as an alternative design.

Figure 1:
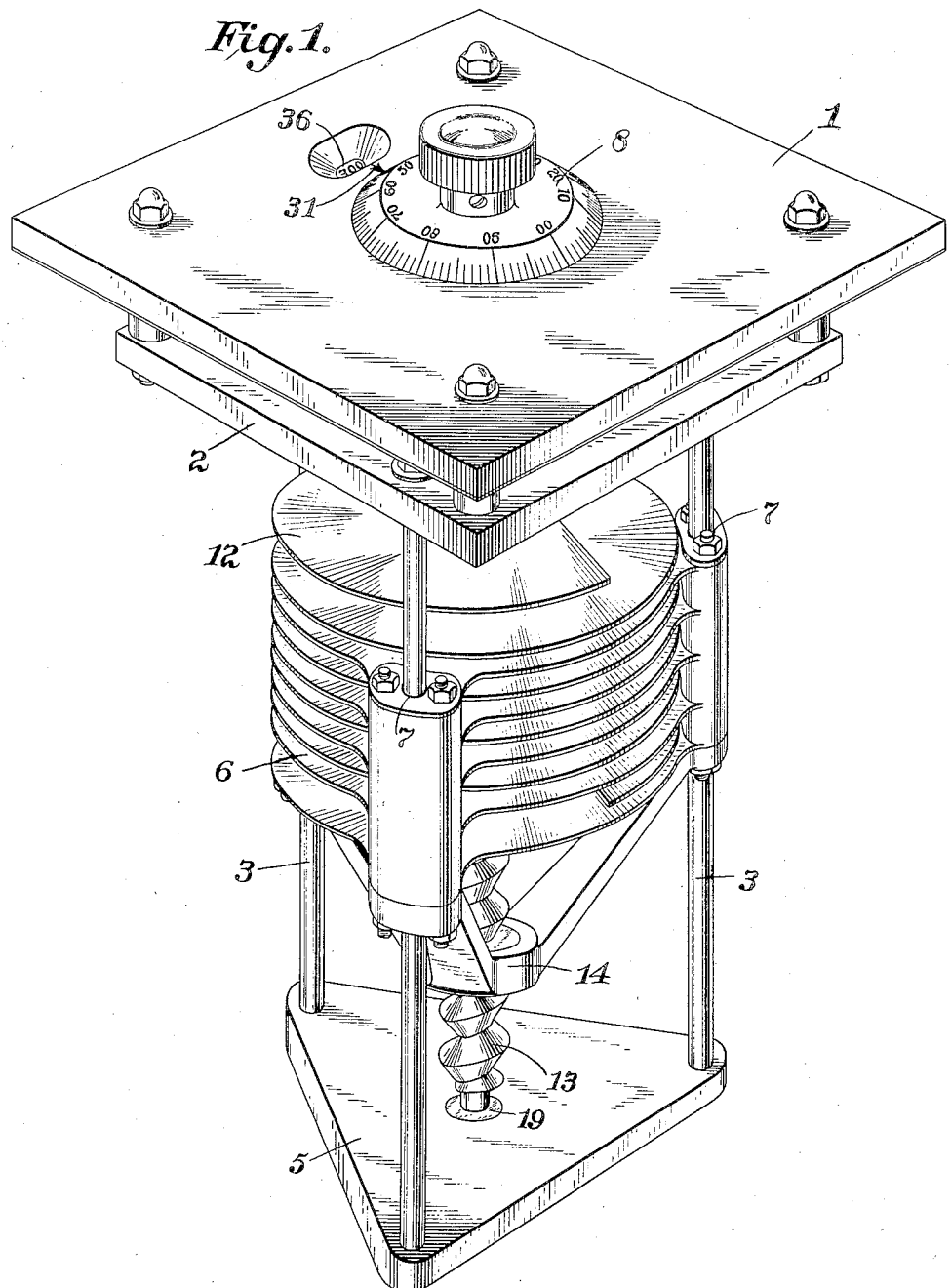
Figure 1 is a perspective view of an adjustable condenser typical of my invention, which may be used in the vertical position as shown or equally well in any other position.
Figure 7:
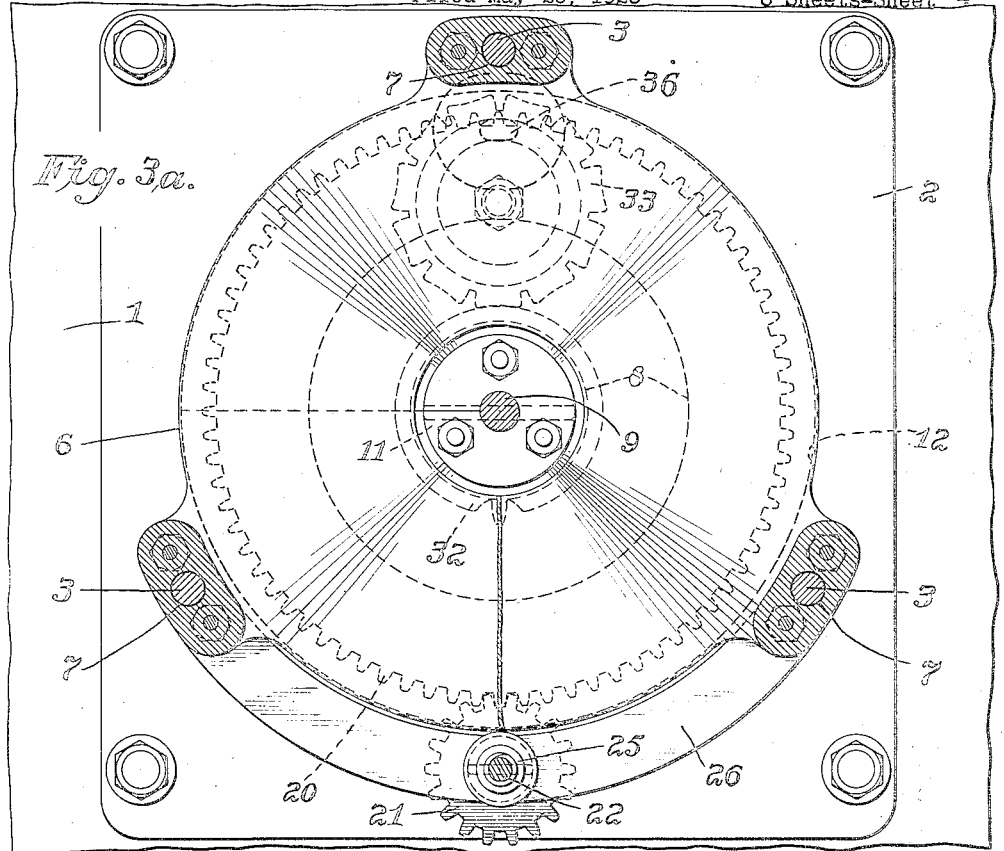

Fig. 7 is a view of the adjustable condenser with the electrodes submerged in oil or other liquid dielectric medium which might be desirable under certain conditions of operation. In a similar manner the adjustable condenser could be encased in a gastight container containing a suitable gaseous dielectric medium under appropriate pressure, the operating spindle being brought through an adequately packed hole to an external operating knob or handle.

Figure 8:
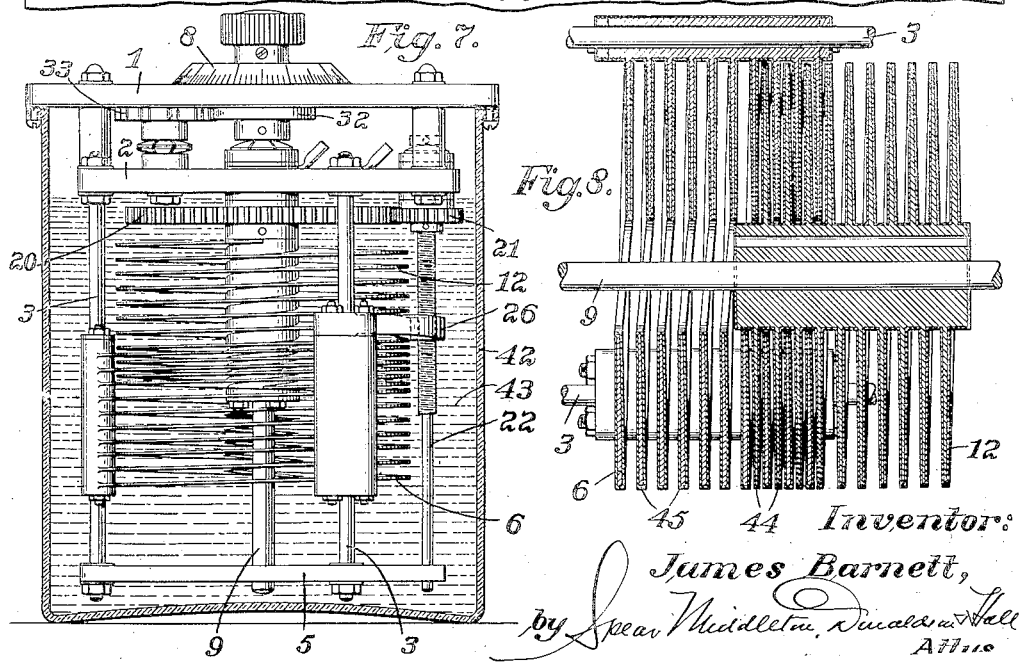

Fig. 8 is a longitudinal section through the electrode members only, showing the electrodes coated with a solid dielectric material. This is a variation which may be used to attain certain operating characteristics. Although both electrodes are shown with the solid dielectric material, it may be omitted from either electrode, being utilized on only one of the electrodes.

In the accompanying drawings, 1 designates a front plate preferably of shielded insulating material, to which may be attached by suitable means a main supporting plate 2, also preferably of insulating material. The main supporting plate 2 carries several guide rods 3 suitably braced to each other by plate 4 or 5 which in some modifications of design should be composed of insulating material. Within the cage formed by the parallel guide rods 3 is an electrode 6 consisting of a helically warped surface of electrically conducting material. This electrode 6 has holes 7 through which the guide rods pass. The holes 7 are of such dimension as to permit the electrode 6 to freely move back and forth in a direction parallel to the axes of the guide rods 3, other motions being prohibited.

An operating knob and dial 8 is attached to a spindle 9 which in turn is attached to a hub 10 or 11 carrying an electrode 12 consisting of a helically warped surface of electrically conducting material, the pitch and the direction of the helix being the same as the pitch and the direction of the helix of electrode 6. Thus by turning the knob 8 the electrode 12 will be rotated.

The hub 10 in the design shown as Fig. 2, is threaded with a V, square or other suitable thread of the same pitch and direction as the pitch and direction of the helix of electrode 6. This threaded hub 10 fits over a threaded spindle 13. The threaded spindle 13 of same pitch and direction as threaded hub 10, is attached to the insulating support 14 in such manner as to preclude threaded spindle 13 rotating around its own longitudinal axis. The insulating support 14 is attached to electrode 6.

Thus when knob 8 is turned it will cause electrode 12 and threaded hub 10 to turn also. As threaded hub 10 turns around threaded spindle 13, the threaded spindle 13 will either be drawn into or driven out of the threaded hub 10, depending on the direction of rotation in relation to the direction of the thread. This longitudinal movement of the threaded spindle 13 is imparted to the insulating support 14 which in turn will impart its longitudinal movement to electrode 6.

Longitudinal movement of electrode 12 is prevented by means of a thrust-bearing. In Fig. 2 the thrust-bearing is comprised of the end surface of hub extension 15, two thrust plates 16 attached to main supporting plate 2, thrust ring 17, and spring-washer 18.

The thrust-bearing is also intended to serve as a device to supply sufficient friction so as to prevent vibration or shock causing rotation of electrode 12, but not to interfere with freedom of rotation when knob 8 is turned by hand. The friction will be due to the forcing together of the thrust-bearing surfaces by spring-washer 18 causing the thrust-bearing surfaces to resist a turning effort.

If electrode 6 and electrode 12 are so arranged initially that the turns of one will occupy the spaces between turns of the other, it will be evident that rotary motion given to operating knob 8 will cause electrode 6 to recede from or proceed into electrode 12. This will result from the combination of rotary motion of electrode 12 and longitudinal motion of electrode 6, being similar in effect to the familiar action of the well-known screw and nut.

In Figs. 3 and 3ª is shown another arrangement of parts for accomplishing the same effect as attained by the arrangement delineated in Fig. 2. This is included to show that it is intended to accomplish the desired effect in more ways than one. In Fig. 3, hub 11 is not threaded but is so made as to allow spindle 9 to extend through as shown, the extension of spindle 9 being free to turn in bearing 19. Bearing 19 is supported in insulating plate 5.

On spindle 9 is also mounted and firmly fixed thereto, gear wheel 20. Gear wheel 20 is meshed with gear wheel 21. Gear wheel 21 which may be of insulating material, is securely attached to threaded spindle 22. Threaded spindle 22 is free to turn in bearing 23 in the main supporting plate 2, and in bearing 24 in insulating plate 5. Threaded spindle 22 passes through the theaded bushing 25 which is securely embedded in insulating yoke 26. Insulating yoke 26 is attached to electrode 6.

Thus when knob 8 is turned it will cause electrode 12 and gear wheel 20 to rotate. The rotation of gear wheel 20 will likewise cause gear wheel 21 and threaded spindle 22 to rotate also. Rotation of threaded spindle 22 will result in imparting longitudinal motion to threaded bushing 25, this motion will be transmitted through insulating yoke 26 to the electrode 6.

With an arrangement of gear wheels, threaded spindle and threaded bushing as shown in Fig. 3, if the pitch of the threaded spindle 22 is made equal to the product of the pitch of the helix of electrode 12 multiplied by the ratio of gear wheel 20 to the gear wheel 21, and if the direction of the thread is made opposite to the direction of the pitch of the helix of electrode 12, when electrode 12 is rotated, electrode 6 will be progressed or retrogressed at precisely the proper rate to permit electrode 12 to screw into or out of electrode 6 in exactly the same manner as accomplished with the condenser design shown in Fig. 2 and described hereinbefore.

The preceding is predicated on the facts that electrode 12 and threaded spindle 22 are restrained from longitudinal motion by means of thrust-bearings. On spindle 9 of electrode 12, the thrust-bearing consists of one end of the hub of gear wheel 20, two thrust plates 16 attached to main supporting plate 2, thrust ring 17, and spring-washer 18. On threaded spindle 22, the thrust-bearing consists of one end of the hub of gear wheel 21, two thrust plates 27 attached to main supporting plate 2, thrust ring 28, spring-washer 29, and retaining ring 30 pinned to or fastened in any suitable manner to threaded spindle 22.

As in the condenser design shown in Fig. 2 and described hereinbefore, the thrust-bearings are also intended as devices to supply sufficient friction so as to prevent vibration or shock causing rotation of electrode 12, but not to interfere with freedom of rotation when knob 8 is turned by hand.

Operating knob and dial 8 is calibrated into a suitable number of divisions. Front plate 1 is provided with a mark 31 to serve as an indicating or reference point by which to read to what position knob 8 has been turned.

On spindle 9 is also affixed the single tooth gear wheel 32. The single tooth gear wheel 32 is in engagement with the intermittent gear wheel 33. Single tooth gear wheel 32 and intermittent gear wheel 33 are an application of the well-known principles of intermittent gearing. Intermittent gear wheel 33 is supported on stud 34 and is pressed into contact with the inner surface of front plate 1 by means of the spring-washers 35. Portions of these details are shown in Figs. 5 and 5ᵃ.

On the side of intermittent gear wheel 33 are symbols or numerals. Front plate 1 has a window 36 so located and of such size as to permit only one symbol or numeral or one group of symbols or numerals on the side of intermittent gear wheel 33, to be seen at each arrested step of motion of intermittent gear wheel 33.

It will be evident that each time operating dial 8 is turned one complete revolution of 360 degrees, not only will the electrode 12 be turned a like amount and screwed into or unscrewed out of electrode 6, but intermittent gear wheel 33 will also be moved one step and will expose a changed indication through window 36 of front plate 1.

The purpose of the intermittent gearing is to show the total number of complete turns of electrode 12 which have been screwed into electrode 6. The combination of the indication given through window 36, and the indication read by referring to the reference mark 31 and the calibrations on the operating knob and dial 8, will indicate the precise setting of the condenser. Obviously, the calibrations on operating knob and dial 8 and the notation on intermittent gear wheel 33 may be in microfarads or other units, or may be merely arbitrary markings.

It is not my purpose to limit myself to the use of the indicating mechanism as shown on the accompanying drawings. I can accomplish the same result by using any one of several well known mechanical motions.

The operation of the alternative form of condenser shown in Fig. 4 is so evident that it needs no further explanation.

Instead of making the electrodes of one-piece continuous helically warped surfaces, a form of construction similar to that indicated in Figure 6 and Fig. 6ᵃ can be utilized. This form of construction contemplates making use of several elements to form a single electrode unit. As shown in Fig. 6 and Fig. 6ᵃ, each element embraces one complete turn or 360 degrees, but more or less than one complete turn could be made use of in like manner. Although only the rotating element and electrode are shown, it is intended that the reciprocating electrode be subject to a similar construction.

In Figs. 6 and 6ᵃ each of the elements 37 is of the form of one complete turn of a helically warped surface of the proper pitch and direction for the purpose intended. Spacers 38 are used to keep the elements 37 in correct relation. Filler pieces 39 and 39' are used at the ends of a group of elements so as to finish the built-up hub with plane surfaces perpendicular to axis of the hub. The spacers 38 and filler pieces 39, 39' may have a smooth bore or may contain sections of a screw-thread as required. The entire assembly of elements 37, spacers 38, and filler pieces 39, 39' are shown in Fig. 6ᵃ bound together with rods 40 and nuts 41, but I do not confine myself to this exact form of construction.

In Fig. 7 the condenser is shown encased in a container 42. Container 42 may serve to protect the condenser from dust or injury, or it may be used as a vessel to keep the condenser submerged in oil or other insulating liquid 43. With suitable modifications so as to preserve the container and front plate gas tight, the container may contain air or other gases at desired pressures.

In Fig. 8 is shown a longitudinal section through the electrode members only. Dielectric or insulating material 44 is shown on the rotating electrode and similar material 45 is shown on the reciprocating electrode. Such application may be made either to one-piece electrodes 6 and 12 or to built-up electrodes consisting of elements similar to elements 37.

Terminals for establishing electrical connections are shown as lugs 46 and 47.

Although for sake of clarity and simplicity the forms of condenser illustrated in the drawings and described in this specification refer to the electrodes as each consisting of only one helically warped surface, another modification desirable under certain conditions would incorporate electrodes each consisting of two or more helically warped surfaces.

Another modification also contemplated as part of my invention but not illustrated in the accompanying drawings, would utilize electrodes in the form of helically warped surfaces without the supplementary feed-screw which has been described thus far as a part of the adjustable condenser. In lieu thereof, if one or both electrodes are encased in a solid dielectric medium, the electrodes will of themselves provide the necessary feeding in and out of the reciprocating electrode and the rotating electrode, means being provided to prevent the two electrode groups from getting entirely out of engagement. Another method for accomplishing the same end, contemplates using suitable guides of insulating material at one or more places on one or both electrode groups, the purpose of the guides being to prevent the electrodes touching each other while being manipulated, means being provided to prevent the two electrode groups from getting entirely out of engagement.

It will be apparent that an adjustable condenser of the general form hereinbefore described will be suitable for minute changes of capacity at any point within its total capacity, that each division of its calibration will represent practically an equal amount of capacity, that the number of steps of adjustment will be infinite, that any position of its setting will be accurately indicated by the means provided, and that any desired adjustment of the condenser can be easily duplicated at any time by merely turning the operating knob the necessary amount to cause the indicating mechanism to show the adjustment required.

Obviously, the details of the structure of this adjustable condenser might be varied to a great degree without departing from the spirit or intent of the invention.

What I claim as my invention and desire to secure by Letters Patent is:

1. A condenser comprising electrodes consisting of electrically conducting material in the form of helically warped surfaces, the helically warped surfaces being composed of segmental elements so assembled as to give in effect continuous helically warped surfaces.

2. An adjustable condenser comprising electrodes in the form of helically warped surfaces, one electrode or set of electrodes being rotatable in relation with the other electrode or set of electrodes, and held against longitudinal movement, said electrodes being arranged so as to permit of their being screwed into or unscrewed out of each other, the electrodes being surrounded by a suitable dielectric medium, with a feed-screw device arranged to cause the non-rotatable electrode member to be positively drawn into or driven out of the rotatable electrode member.

3. A variable condenser comprising a pair of relatively movable plates in the form of spirals of like configuration adapted to interfit to any desired degree, and means for simultaneously imparting rotative movement to one of said plates and sliding movement to the other of said plates.

4. A condenser comprising a spiral plate fixed to a shaft and a second plate slidable by a cam on said shaft.

5. A condenser comprising a plurality of plates mounted to permit relative movement, and means whereby one of said plates is caused to slide when another of said plates is rotated.

6. A variable condenser of the character described, comprising a support, a shaft rotatable in said support, a capacity element mounted on said shaft for rotation therewith, a second capacity element movably mounted on said support, a connection between said shaft and said second capacity element operable in the rotation of the shaft to move the second capacity element on the support relative to the first mentioned capacity element, the relative movement between said capacity elements being adapted to produce an inter-threading cooperation thereof to vary the capacity of said elements in an electric circuit.

7. A variable condenser of the class described, comprising a support, a shaft rotatable in said support, a helical capacity element mounted on said shaft and rotatable therewith, a cooperating helical capacity element movably mounted on said support, an operating connection between said shaft and said movable capacity element operable to move said movable capacity element in a predetermined relation with respect to each rotation of the shaft to produce an interthreading cooperation between said movable and rotary capacity elements to vary the capacity of the condenser in an electric circuit.

8. In an electrical condenser, a helical stator consisting of a plurality of perforated discs cut through from the perforations therein to the peripheries thereof and formed into helical convolutions, and arranged with the end of one such convolution in contact with the end of another such convolution, and means to support the helix thus formed.

In testimony whereof, I affix my signature.

JAMES BARNETT.